A. W. HOLLAND & E. N. McKIMM.
Animal-Trap.

No. 209,397. Patented Oct. 29, 1878.

WITNESSES:
Francis McArdle.
C. Sedgwick

INVENTOR:
A. W. Holland
E. N. McKimm
BY Munn & Co
ATTORNEYS.

UNITED STATES PATENT OFFICE.

ASHLEY W. HOLLAND AND EDGAR N. McKIMM, OF LATHROP, MISSOURI.

IMPROVEMENT IN ANIMAL-TRAPS.

Specification forming part of Letters Patent No. 209,397, dated October 29, 1878; application filed July 1, 1878.

*To all whom it may concern:*

Be it known that we, ASHLEY W. HOLLAND and EDGAR N. McKIMM, of Lathrop, in the county of Clinton and State of Missouri, have invented a new and useful Improvement in Animal-Traps, of which the following is a specification:

Our invention relates particularly to the class of traps in which a wire loop or bow, actuated by a spring and working behind an opening, is employed for catching rats and mice.

The invention consists in the combination, with the case having taper hole in the top, of a tapering perforated plug and hook; also, in the combination, with an animal-trap, of a cover having a grain jacket or chamber at the sides, the latter having cover of wire-gauze, all as hereinafter described.

The accompanying drawing represents a trap embodying our improvements.

Figure 1:
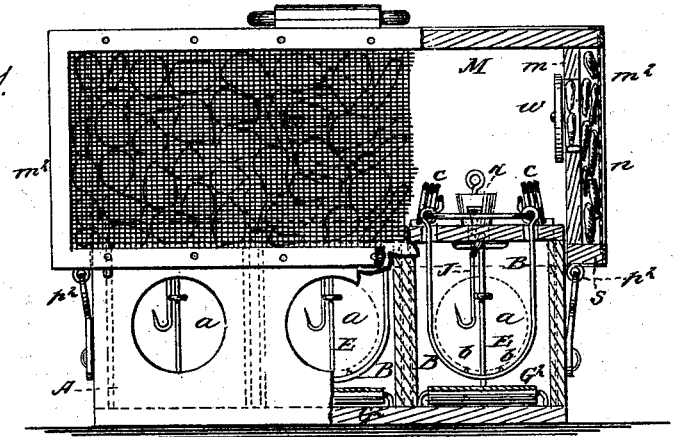
Figure 2:
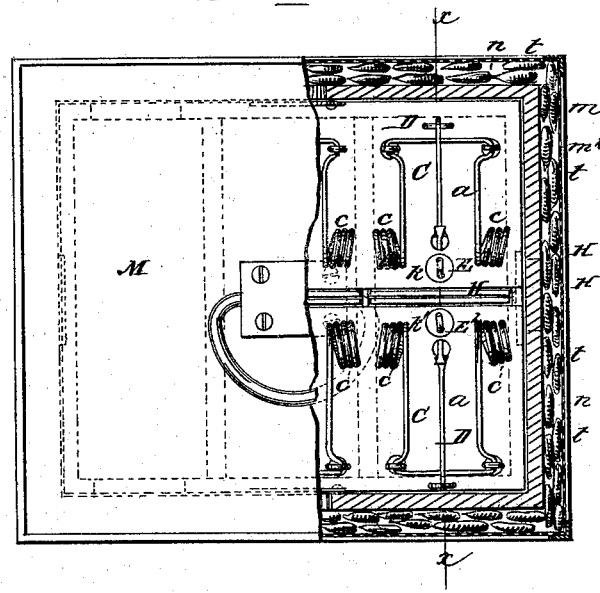
Figure 3:
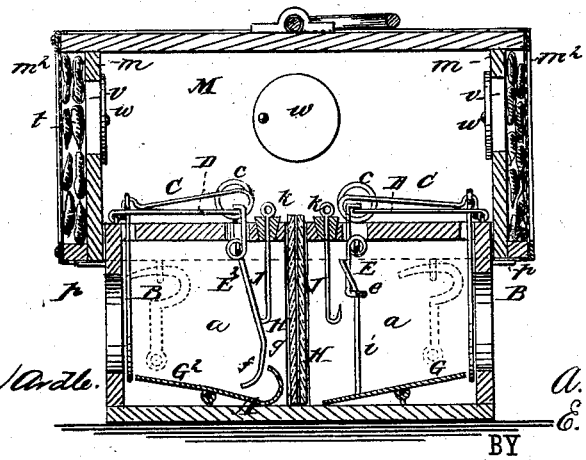

Figure 1 is a side view, partly in section, of the trap and attachment. Fig. 2 is a top view partly in section. Fig. 3 is a vertical section taken in the line $x\ x$ of Fig. 2.

Similar letters of reference indicate corresponding parts.

The working parts of the trap are carried by a casing, A, which may be of any desired form in its general outline—either circular, quadrilateral, or polygonal—and it may be divided into any suitable number of compartments. Each group or set of working parts constitutes a single trap, and may be applied to a trap for catching a single animal at a time. As here represented, the trap is divided into six compartments, $a$, each provided with a set of working parts, and thus provision is made for catching six rats by one setting of the trap.

The working parts in each group or set consist of a bow or loop for catching and holding the animal by the neck or shoulders, a spring for actuating said loop, a trip-lever for holding down the loop and spring, a trigger for holding the trip-lever, and a treadle for operating the trigger to release the trip-lever.

The loop or bow B is made in the usual or any suitable form by bending a piece of wire midway of its length and providing its ends with rings or eyes for engagement with the spring. The portion of the bow which comes in contact with the animal is provided with spurs, pins, or projections $b$, which may be long enough to pierce the body and kill the animal; but, in order to prevent the drawing of blood, and thereby scenting the trap so that other animals would avoid it, we prefer to make them, as shown in Fig. 1, only long enough to engage with the skin of the animals sufficiently to prevent them from working themselves out of the bow, in the event of the spring not being strong enough to kill them at once or to hold them securely when caught.

The spring C is of the usual general form and construction, with the exception of the coil $c$, which renders it elastic. In springs of this kind, when made in the usual way, each coil forms a perfect circle, and the portion of the wire which extends outward to connect with the bow leaves the circle in a tangential direction. In our invention said wire leaves the coil in a radial direction, starting from the periphery of the circle at the portion farthest from the bow or loop, passing diametrically across the circle, and extending in a straight line to the point of connection with the bow. By this means greater leverage is obtained, and a stronger and stiffer spring is produced than when the wire leaves the circle tangentially.

The trip-lever D is of the same form as those in common use. The trigger has its upper portion constructed in the usual way, and it is pivoted in the same manner as those in common use, but the lower portion may be made in either of the two forms shown herein. Referring to the compartment $a$, toward the right-hand side of Fig. 3 of the drawing, it will be seen that the trigger E extends downward a distance equal to about half the height of the compartment $a$, and has a ring or eye, $e$, formed at its lower end. In the other compartment $a$ shown in said figure the trigger $E^2$ extends downward nearly to the bottom of said compartment, and has its lower end slightly curved, as shown at $f$.

The treadle is pivoted in a similar manner to those in common use, with the outer end higher than the inner end, so that the pressure of the animal's feet will oscillate it in order to operate the trigger.

The treadle G (shown in the right-hand compartment) is provided with a wire rod, $i$, extending upward from it and passing through the ring or eye $e$ at the lower end of the trigger, so that when the front end of the treadle is depressed by the feet of the animal the rod $i$ and the lower end of the trigger will move toward the front of the trap, so as to throw the nose of the trigger in the opposite direction and release the trip-lever D, and allow the spring C and bow B to fly up. The treadle $G^2$ (shown in the left-hand compartment) has its near or inner edge curved upward and forward, as shown at $g$, so that when the front end of this treadle is depressed the edge of the curved portion $g$ will strike the curved lower portion, $f$, of the trigger and move it forward, so as to throw the nose backward and release the trip-lever and the spring and bow.

Instead of attaching the bait to the trigger, as has heretofore been done, we employ a rod, J, with a hook at its lower end, which has the bait attached to it, and is then placed in position from above the trap by passing it through a hole in the top. The rod J is attached at its upper end to a plug or stopper, $k$, which fits the hole through which the rod and bait pass. The hole may be of any suitable shape, and is located in rear of the trigger, so that the bait will hang near the rear wall of the compartment.

The partitions H, which form the rear walls of the compartments $a$, are preferably made of looking-glass. As here represented, the partition between each two compartments, located back to back on opposite sides of the trap, is composed of two mirrors, arranged back to back and placed in position by dropping them from above through a slot in the top of the casing A. A rat on looking in the entrance to the compartment $a$ will see the bait and its reflection, and also a reflection having the appearance of another rat entering the compartment from an opposite direction, and being deceived thereby will enter the compartment, stepping on the treadle and pulling the trigger, and will be caught by the bow or loop as it ascends in the usual way.

In connection with the trap we employ a cap or casing, M, of box-like form, having a height or depth sufficient to entirely cover the springs or loops when at their highest position. This cap or cover M fits nicely over the top of the casing A, resting on shoulders, projections, or pins $p$, (see Fig. 3,) and is provided with hooks and eyes $p^2$. (See Fig. 1.) The sides of the box or cap M are double, with a space between them. The inner sides, $m$, may be of the same material as the top, and are close and solid; but the outer sides, $m^2$, are made of wire cloth or netting. The space $n$ between the inner and outer sides, $m$ and $m^2$, is wide enough to contain grains of corn, small fruits, or other suitable substances, as indicated by the letter $t$, for the purpose of tempting the rats to enter the trap. The top of the space $n$ is closed by the top of the cap M, and the bottom is closed by strips $s$. The grain or other substance is introduced through openings $v$ in the inner side pieces, provided with doors $w$. This cap or cover M, when in place on the casing A, entirely conceals the working parts of the trap, and also prevents them from being operated from the top or in any other manner than by the entrance of a rat into the compartment; and the rats are decoyed by the grain or other substance, which they can both see and smell through the wire net-work $m^2$, and are induced to enter the compartments $a$ in search of means of access to the cap or cover.

The apparatus consisting of the parts thus constructed and connected may be provided with a handle on the top of the cap for carrying it.

We are aware that it is not new in animal-traps to use a spring with straight portion and circular coil, a vibrating board provided with a curved rod engaging a notched rod for operating the vibratory lid, the rear wire grate to close rear of trap, a detachable decoy-box, nor a mirror placed in the rear of trap.

What we claim is—

1. The combination, with the case A, having taper hole in top, of the taper perforated plug $k$ and hook $j$, as and for the purpose described.

2. The combination, with an animal-trap, substantially as described, of the cover M, having a grain jacket or chamber at the sides, the latter being covered with wire-gauze, as and for the purpose specified.

ASHLEY WINN HOLLAND.
EDGAR NICKLESS McKIMM.

Witnesses:
B. S. G. STONE,
T. H. B. TURNER.